US006252945B1

(12) United States Patent
Hermann et al.

(10) Patent No.: US 6,252,945 B1
(45) Date of Patent: *Jun. 26, 2001

(54) METHOD FOR RECORDING A DIGITIZED AUDIO SIGNAL, AND TELEPHONE ANSWERING MACHINE

(75) Inventors: Michael Hermann, Mühldorf; Achim Degenhardt, Germering, both of (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,855

(22) Filed: Sep. 29, 1998

(30) Foreign Application Priority Data

Sep. 29, 1997 (DE) ............................................. 197 42 944

(51) Int. Cl.$^7$ ...................................................... H04M 1/64

(52) U.S. Cl. ...................................... 379/88.1; 379/88.22

(58) Field of Search .................................. 379/68, 88.07, 379/88.08, 88.09, 88.1, 88.28, 88.22

(56) References Cited

U.S. PATENT DOCUMENTS

| 4,916,742 | * | 4/1990 | Kolesnikov et al. | ................. | 704/215 |
| 5,163,082 |   | 11/1992 | Karnowski . | | |
| 5,506,872 | * | 4/1996 | Mohler | ................................. | 375/240 |
| 5,592,584 | * | 1/1997 | Ferreira et al. | ...................... | 704/203 |
| 5,724,475 | * | 3/1998 | Kirsten | ................................. | 386/109 |
| 5,742,734 | * | 4/1998 | DeJaco et al. | ........................ | 707/226 |
| 5,805,671 | * | 9/1998 | Ohuchi | ................................. | 379/88.1 |
| 5,812,195 | * | 9/1998 | Zhang | ................................. | 348/415 |
| 6,049,765 | * | 4/2000 | Iyengar et al. | ........................ | 704/201 |

FOREIGN PATENT DOCUMENTS

| 44 26 534 A1 | 2/1996 | (DE) . |
| 44 26 534 C2 | 6/1996 | (DE) . |
| 0 700 192 A1 | 3/1996 | (EP) . |
| 63-285769A | * 11/1988 | (JP) . |
| 8-98134 | 4/1996 | (JP) . |

OTHER PUBLICATIONS

Advanced Business Multimedia Messaging with AT&T Intuity System [online]. AT&T, Jan. 10, 1994 [retrieved on Oct. 22, 2000]. Retrieved from the Internet: <URL:www.at-t.com/press/0194/94110.gba.html>.*
"Design of a Full–Featured, Solid–State Telephone Answering Device" (Ferris), IEEE, No. 4263, Jun. 1989.
Japanese Patent Abstract No. 63285769 (Yoichi), dated Nov. 22, 1988.
Japanese Patent Abstract No. 02078058 (Yoshitaka), dated Mar. 19, 1990.
Japanese Patent Abstract No. 08214058 (Hitoshi), dated Aug. 20, 1986.

* cited by examiner

Primary Examiner—Scott L. Weaver
Assistant Examiner—Roland G. Foster
(74) Attorney, Agent, or Firm—Herbert L. Lerner; Laurence A. Greenberg; Werner H. Stemer

(57) ABSTRACT

A method for recording a digitized audio signal and a telephone answering machine in which this method can be advantageously employed. A digitized audio signal is written in during a first time segment, and the written-in data are then stored in memory in a storage medium for digital data. After the first time segment, the writing in of the digital input signal is continued. The data now written in are compressed by a predetermined compression algorithm in accordance with a predetermined data compression rate. Finally, the thus-compressed data are stored in the storage medium for digital data. With the method, especially economical utilization of a limited memory storage volume is possible.

7 Claims, 1 Drawing Sheet

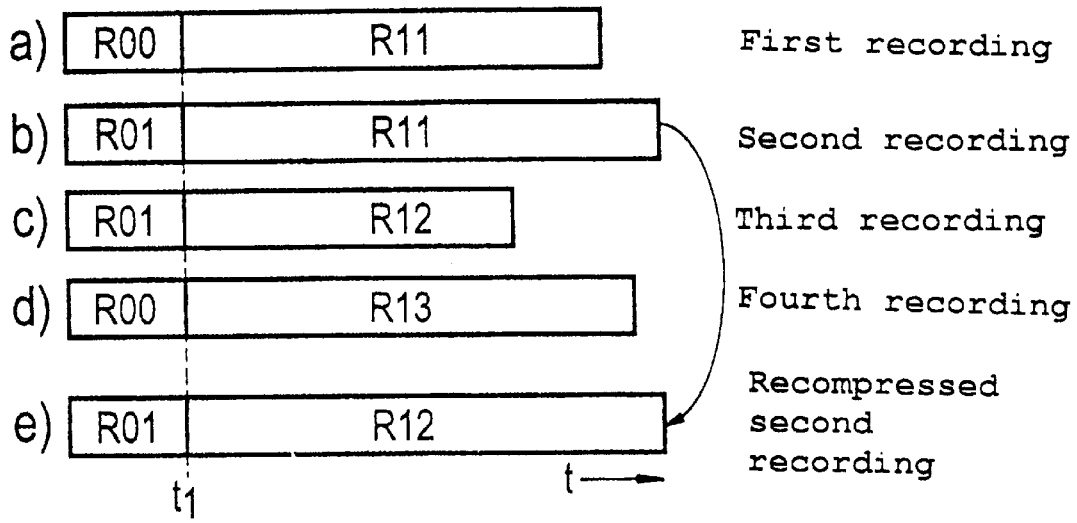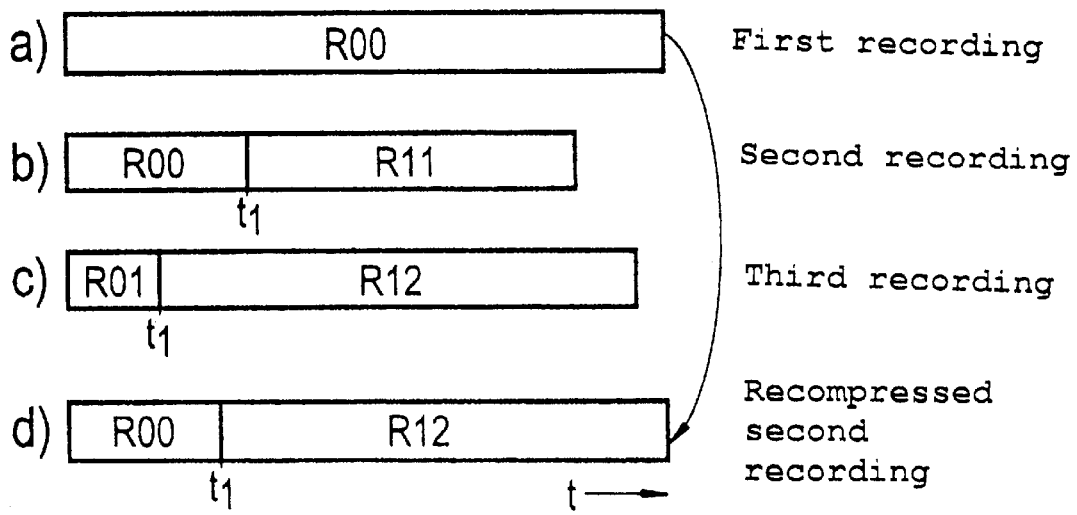

METHOD FOR RECORDING A DIGITIZED AUDIO SIGNAL, AND TELEPHONE ANSWERING MACHINE

BACKGROUND OF THE INVENTION

Field of the Invention

The invention relates to methods for recording a digitized audio signal and a telephone answering machine in which such methods can advantageously be employed.

In digital answering machines currently available on the market, the digitized signal of a recorded acoustical message is reduced from the data quantity that recorded with optimal conversion to a lesser data quantity in order to save on the cost of required memory. For storing digital data in memory, the analog speech signal is digitized at a predetermined sampling rate in a first step. The resultant data stream is compressed in a second step with the aid of a data or speech compression process. The data stream reduced by the data compression is then recorded in a third step in a digital memory. A system operating on this principle has been integrated for instance into the answering machine, type GIGASET 1030 available from the present applicant.

The ratio between the incoming data stream per unit of time (that is, the sampling rate of an A/D converter or of the digital speech information arriving in an ISDN telephone) and the data stream per unit of time present after the data compression is called the data compression rate. A high data compression rate accordingly achieves a major reduction in data volume as a result of the compression. However, with an increasing data compression rate the speech intelligibility drops. A compromise must be made between the magnitude of the data compression rate and the resultant speech intelligibility.

In currently available answering machines, the digital speech recording is done with a fixed data compression rate. Some equipment still allows manual variation of the data compression rate, but that must be specified by the user and cannot be controlled automatically. Other equipment allows retroactive data condensation of already recorded messages, in that the recorded messages are read out of the memory and subjected to data compression and then written back into the memory. This process is often called recompression.

A method for controlling signal recording for a digital answering machine is known from Published, Non-Prosecuted German Patent Application DE-OS 44 26 534. In the method, once again, the possibility of data compression is employed.

According to the method disclosed therein, the signal recording is controlled by regulating the ratio between speech quality and recording capacity as a function of the data quantity to be recorded. To that end, the data compression rate is set as a function of the still-available memory capacity, or data recompression is performed. However, then it is always an entire message that is subjected to data compression.

From Japanese Patent Disclosure JP-8-98134, a data recording device has become known in which the digitized video or audio data are recorded in a recording medium at a variable compression rate. The compression rate is made dependent on the data information quantity with the aid of a discriminator circuit. This entails a great expense for circuitry.

SUMMARY OF THE INVENTION

It is accordingly an object of the invention to provide a method for recording a digitized audio signal, and a telephone answering machine which overcome the above-mentioned disadvantages of the prior art methods and devices of this general type, with which the data compression of an audio signal can be manipulated more flexibly, in an especially simple manner.

With the foregoing and other objects in view there is provided, in accordance with the invention, a method for recording a digitized audio signal in a telephone answering machine, which includes: a) writing in a digital input signal during a first time segment resulting in a written data signal; b) compressing the written data signal with a compression algorithm at a predetermined first compression rate greater than or equal to 1 resulting in compressed data; c) storing the compressed data in a storage medium for storing digital data; d) writing in the digital input signal after the first time segment resulting in a further written data signal; e) compressing the further written data signal with the compression algorithm at a predetermined second data compression rate resulting in further compressed data, the second data compression rate being greater than or equal to the first data compression rate; and f) storing the further compressed data in the storage medium.

One preferred method for recording a digitized audio signal according to the invention is performed by writing in the digital input signal up to a first time and storing the written-in data in a storage medium. The writing in of the digital input signal is continued after the first time, and the data then written in are compressed by a compression algorithm, which typically involves loss, in accordance with a predetermined first data compression rate. The compressed data obtained after the data compression are then recorded in the storage medium. Such a procedure is advantageous, since in a telephone call the caller will typically say his name and possibly his telephone number and address at the beginning of the call. This information should be recorded with the highest quality. The part of the message that follows can then be recorded with reduced speech quality, because the caller is identified and any information that might then be lost can as a rule be easily recovered. In a preferred embodiment of the method, the first time period depends on the written-in signal. In an alternative embodiment, the first time period has a predetermined value. In an especially preferred exemplary embodiment of the invention, the input signal written during the first time period is subjected to data compression at a first data compression rate. The first data compression rate is less than or equal to the second data compression rate. The second data compression rate reduces the data quantity in the initial portion of a telephone call to a value at which a predetermined minimum speech quality is assured. Nevertheless, the data quantity to be recorded is reduced compared with the data quantity originally present.

In an especially preferred exemplary embodiment of the invention, before the digital input signal is written in, an already recorded digitized audio signal is read out of the storage medium. That is, a signal to be written in is obtained by readout of a stored message from the memory, so that it can then be resubjected to compression. This brings about recompression of the already recorded data after the first time period, so that by the compression of the data storage space for further recordings is made available. It is especially preferred in this respect that the compression be done at a predetermined third data compression rate, which is greater than the first compression rate. This is especially advantageous when a first data compression has already been performed the first time a recording was made. The first, second and third compression rate are each chosen from many available compression rates.

It is very particularly preferred also that the read-out digitized audio signal be checked for its compressibility. This assures that the speech quality will not be impaired excessively. The checking is preferably done on the basis of the signal of the read-out audio signal, the magnitude of a background noise contained in the audio signal, or the fact that the audio signal has already been listened to. It is especially preferred that this recording method be performed successively until the checking shows that no further compression is possible.

In each of the exemplary embodiments described, the first, second and third compression rate should be chosen on the basis of the input signal from the many available compression rates. In this choice, it is also possible to dispense with data compression entirely. It is also especially preferred, when data are stored in the storage medium, that information about the compression rate that has just been used be stored in the storage medium. That information can be used when a message is later played back.

In accordance with an added feature of the invention, there is the step of selecting the predetermined first compression rate, the predetermined second compression rate and the predetermined third compression rate on a basis of the digital input signal.

In accordance with an additional feature of the invention, there is the step of storing information relating to a respective compression rate used in the compression steps in the storage medium.

With the foregoing and other objects in view there is also provided, in accordance with the invention, a method for recording a digitized audio signal in a telephone answering machine, which includes: a) writing in a digital input signal during a first time segment resulting in a written data signal; b) compressing the written data signal with a compression algorithm at a predetermined first compression rate greater than or equal to 1 resulting in compressed data; c) storing the compressed data in a storage medium for storing digital data; d) writing in the digital input signal after the first time segment resulting in a further written data signal; e) compressing the further written data signal with the compression algorithm at a predetermined second data compression rate resulting in further compressed data, the second data compression rate being greater than or equal to the first data compression rate; f) storing the further compressed data with the compressed data resulting in a once-compressed data signal in the storage medium; g) reading-out the once-compressed data signal from the storage medium and checking the once-compressed data signal for further compressibility, compressing the once-compressed signal with the compression algorithm at a compression rate greater than a previous compression rate resulting in once-again compressed data signal if the once-compressed data signal passes the checking step; and h) repeating step g) on the once-again compressed data signal until the once-again compressed data signal fails the checking step.

With the foregoing and other objects in view there is further provided, in accordance with the invention, a compression circuit for a telephone answering machine, including: a storage medium for storing digital data; a recording device connected to the storage medium for recording data into the storage medium; a compression device for compressing a digitized audio signal connected to the recording device; and a switchover device outputting a switching signal received by the compression device for switching over a compression rate of the compression device from a first compression rate to a second compression rate during ongoing data recording of an input signal, the second compression rate being greater than or equal to the first compression rate.

In accordance with another feature of the invention, the switchover device has a checking device for checking a compressibility of the input signal after a predetermined time segment.

In accordance with a concomitant feature of the invention, the switchover device has a selection device for selecting the compression rate on a basis of an outcome of the checking device.

A preferred telephone answering machine has a storage medium for storing digital data, a device for compressing the digitized audio signal, and a device for recording data in the storage medium. The telephone answering machine is characterized by a device for switching over the compression device during an ongoing recording. By switching over, the compression device can even be turned on and off in its function. This kind of telephone answering machine is capable, for instance of performing the methods described above, and achieving the aforementioned advantages.

It is especially preferred that the switchover device be equipped with a checking device that checks the compressibility of the input signal. It is very particularly preferred that the switchover device be provided with a selector device, with which the compression rate can be selected on the basis of the outcome of the checking device. A compression rate with the amount 1 is equivalent to a turned-off compression device.

A preferred method for recording a digitized, compressed audio signal in a storage medium of a telephone answering machine includes subdividing the digital data stream to be recorded into data packets, inserting information on each data packet with regard to the compression rate employed in the compression of the audio signals, and storing the thus-obtained data packets in the storage medium. The information stored in memory in such a way can be accessed again on playback in order to evaluate it accordingly. It is also especially preferred that information about the fact that the audio signal has already been listened to once be inserted.

Other features which are considered as characteristic for the invention are set forth in the appended claims.

Although the invention is illustrated and described herein as embodied in a method for recording a digitized audio signal, and a telephone answering machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic view of a course over time of individual message recordings in accordance with a first exemplary embodiment according to the invention; and FIG. 2 is a diagrammatic view of a course over time of various message recordings in accordance with a second exemplary embodiment.

DESCRIPTION OF THE PREFERRED EMBODIMENTS

Referring now to the figures of the drawing in detail and first, particularly, to FIG. 1 thereof, there is shown in diagram form how individual message recordings are recorded in a digital storage medium. The horizontal bars a)–e) represent the course over time of various message recordings. The resultant storage capacity needed is a function of the length of the bar in conjunction with the compression rate on which it is based. As can be seen from FIG. 1, the majority of a message is recorded with a first compression rate, and the initial portion of a message up to a time $t_1$ is recorded at a second data compression rate. The time $t_1$ in the exemplary embodiment of FIG. 1 is fixed at the same predetermined value for all message recordings.

In the first recording a), the data compression rate R00 is used for the initial portion of the message, and the compression rate R11 is used for the main portion of the message. The compression rate R00 amounts to one, so that for the initial part of the message no compression is done. The compression rate R11 is a value selected from many possible data compression rates. For the second recording b), in the initial part of the message the compression rate R01 was used, while in the main body of the message once again the compression rate R11 was used. The compression rate R01 is less than or equal to the compression rate R11. In the third recording c), the data compression rate R01 was used for the initial part of the message and the data compression rate R12 was used for the main body of the message.

Once again, the data compression rate R01 is less than or equal to the data compression rate R12. However, the data compression rate R12 differs from the data compression rate R11 employed in the first and second recording. In the preferred exemplary embodiment of FIG. 1, the data compression rate R12 is greater than the data compression rate R11. In the fourth recording d), no compression was selected for the initial part of the message. That is, the data compression rate is R00=1, while a data compression rate R13 was selected for the main body of the message. In a preferred exemplary embodiment, the data compression rate R13 is greater than the data compression rate R12.

FIG. 1 moreover shows a recompressed second recording e), which is created when the second recording b) is read out and subjected to another compression operation. In the exemplary embodiment of FIG. 1, the compression rate R01 for the initial part of the message remains unchanged, and the compression rate for the main body of the message rises from the data compression rate R11 to the data compression rate R12. Because of the now increased data compression rate, less storage space is needed to store the message in a digital storage medium, while the chronological duration of the recording is unchanged. Nevertheless, the recording quality for the initial part of the message R01 is unchanged.

FIG. 2 in a similar way shows the course over time of different recordings in the storage medium. The exemplary embodiment of FIG. 2 differs from that of FIG. 1 in that in this case the time $t_1$ can be selected to be different for different recordings. This can depend on the total previous storage space occupation rate or on the acoustical quality of the input signal, and in particular on background noise or the prevailing average signal level.

The first recording a) of FIG. 2 has been recorded throughout at the data compression rate R00=1 and accordingly has not been compressed. The second recording b) was recorded in the initial part of the message at the data compression rate R00, and the main body of the message after time $t_1$ was recorded at the data compression rate R11. The third recording c) of FIG. 2 was recorded in a similar way to the third recording c) of FIG. 2. In the third recording c) of FIG. 2, a different time $t_1$ is present as a boundary between the initial part and main body of the message. FIG. 2 also shows a recompressed first recording d), in which the first recording a), originally recorded without compression, is now left without compression up to a time $t_1$, while for their re-recording of the main body of the message a data compression rate R12 was selected.

The method of the invention is advantageous because at the beginning of a telephone call, the caller generally says his name, which should be recorded at the highest possible quality. The rest of the message can be recorded at reduced quality. If for storage space reasons later data compression of already stored messages should be required, it can be appropriate to exclude the initial part of the message from the later data compression, or to select a lesser data compression rate for the initial part of the message than for the main body of the message. This assures that even after the additional data compression, at least the critical part of a message when listened to later will remain intelligible. This allows the message receiver to identify the caller.

The switchover of the data compression rate within the message necessitates storing the compression rate used in memory in the data stream. Accordingly additional control information must be inserted into the compressed data stream. The data stream can advantageously be subdivided into data packets for this purpose, with each data packet combining a certain number of data bits of the message. Alternatively, the data stream can also be subdivided into time units that in turn have data packets. The packet size then depends on the compression rate employed. In each case, a message is made up of many data packets. For each of the data packets, one item of control information is stored in memory. The items of control information include the data compression rate used and optionally the size of the data packet. The data compression rate then applies to all the data in the data packet. As an alternative to storing the control information in memory in the data stream, the time of the switchover of the data compression rate can be stored in a memory outside the message, in the form of an associated table. In the table, the applicable time of the switchover of the data compression rate and the magnitude of the data compression rate used beyond that time are stored.

The method is also suitable for retroactive data compression without suffering any substantial loss in speech quality. In this process only those messages in which it can be expected that intelligibility will not be substantially impaired upon the further compression are compressed further. Also with the method, a flexible association between various data compression rates and the individual messages is possible. This has the advantage that the data compression rate is selected in accordance with the expected loss of quality.

Criteria for the selection of a data compression rate are for instance the fact of whether a message has already been listened to, the intensity of existing background noise in the acoustical signal, and the average signal level of the acoustical signal. For messages that have already been listened to, it is no longer necessary to store the main body of the message with especially high speech quality, since a user will readily remember the message even if the message might have become unintelligible in some places because of reduced speech quality. To that end, it may be advantageous to store in memory the time when the message that has been heard was listened to.

Background noise in a message is also suitable as a selection criterion for the data compression. In messages with major background noise, a certain amount of data compression would lead to a markedly greater loss of quality than in messages with little background noise. Such messages should therefore be recorded at a lower data compression rate and accordingly may not be suitable for recompression. The information on the noise level can be determined for instance during the first recording and stored in memory along with the information data.

The average signal level during the recording is suitable as a further selection criterion for the data compression rate. Signals with a low average signal level typically have a higher noise level, which again makes itself felt in an increased loss of quality upon data compression. The average signal level can therefore advantageously be stored in memory along with the information data the first time the message is recorded.

We claim:

1. A method for recording a digitized audio signal of messages in a telephone answering machine, which comprises:

a telephone answering machine writing in a digital input signal message during a predetermined first time segment beginning at a start of the input signal message resulting in a written data signal;

before writing in the digital input signal message during the first time segment, the telephone answering machine deriving the digital input signal message by reading out a stored digitized audio signal from a storage medium;

selecting a predetermined first data compression rate, a predetermined second data compression rate, and a predetermined third data compression rate based on the digital input signal message;

compressing the written data signal with a compression algorithm of the telephone answering machine at the predetermined first data compression rate greater than or equal to 1 resulting in compressed data;

storing the compressed data in a storage medium for storing digital data in the telephone answering machine;

the telephone answering machine writing in the remainder of the digital input signal message after the predetermined first time segment resulting in a further written data signal;

compressing the further written data signal with the compression algorithm of the telephone answering machine at the predetermined second data compression rate resulting in further compressed data, the second data compression rate being greater than the first data compression rate;

storing the further compressed data in the storage medium;

compressing the further written data signal with the compression algorithm of the telephone answering machine at the predetermined third data compression rate resulting in further compressed data, the third data compression rate being greater than the second data compression rate; and storing the further compressed data in the storage medium.

2. The method according to claim 1, which comprises deriving a length of the first time segment as a function of the written data signal.

3. The method according to claim 1, which comprises checking the read-out audio signal for its compressibility.

4. The method according to claim 3, which comprises performing the checking step on a basis of at least one of a signal strength of the read-out audio signal, a magnitude of background noise contained in the read-out audio signal, and if the read-out audio signal has already been read out once before.

5. The method according to claim 1, which comprises storing information relating to a respective compression rate used in the compression steps in the storage medium.

6. A method for recording a digitized audio signal of messages in a telephone answering machine, which comprises:

a telephone answering machine writing in a digital input signal message during a predetermined first time segment beginning at a start of the input signal message resulting in a written data signal;

before writing in the digital input signal message during the first time segment, the telephone answering machine deriving the digital input signal message by reading out a stored digitized audio signal from a storage medium;

selecting a predetermined first data compression rate, a predetermined second data compression rate, and a predetermined third data compression rate based on the digital input signal message;

compressing the written data signal with a compression algorithm of the telephone answering machine at the predetermined first data compression rate greater than or equal to 1 resulting in compressed data;

storing the compressed data in a storage medium for storing digital data in the telephone answering machine;

the telephone answering machine writing in the remainder of the digital input signal message after the predetermined first time segment resulting in a further written data signal;

compressing the further written data signal with the compression algorithm of the telephone answering machine at the predetermined second data compression rate resulting in further compressed data, the second data compression rate being greater than the first data compression rate;

storing the further compressed data with the compressed data resulting in a once-compressed data signal in the storage medium;

reading-out the once-compressed data signal from the storage medium and checking the once-compressed data signal for further compressibility, compressing the once-compressed signal with the compression algorithm at the predetermined third compression rate greater than a previously used compression rate resulting in a twice-again compressed data signal if the twice-compressed data signal passes the checking step;

storing the further compressed data with the compressed data resulting in a twice-compressed data signal in the storage medium;

reading-out the twice-compressed data signal from the storage medium and checking the twice-compressed data signal for further compressibility, compressing the twice-compressed signal with the compression algorithm at a compression rate greater than a previously used compression rate resulting in a thrice-again compressed data signal if the thrice-compressed data signal passes the checking step; and repeating the preceding step on the thrice-again compressed data signal until the thrice-again compressed data signal fails the checking step.

7. The method according to claim 6, which comprises checking the read-out audio signal for its compressibility.

* * * * *